Patented Apr. 7, 1942

2,278,635

UNITED STATES PATENT OFFICE 2,278,635

RESIN COMPRISING COPOLYMERS OF DI-VINYL KETONE AND DI-ISOPROPENYL KETONE

Carl E. Barnes, Worcester, Mass., assignor, by mesne assignments, to E. I. du Pont de Nemours & Company, Wilmington, Del., a corporation of Delaware No Drawing. Application November 15, 1938, Serial No. 240,530

1 Claim. (Cl. 260—86)

This invention relates to copolymers and more particularly to copolymers of substances containing unsaturated methylene groups which are capable of polymerizing to form a synthetic resin.

Various compounds containing the unsaturated group $CH_2=$ are capable of polymerization by a rearrangement of the primary valence bonds in such a way that a more saturated structure is produced which consists of a linear chain having the methylene group as a repeating unit. The linear polymers ordinarily have the properties of fusibility and solubility, and the length of the chain (molecular weight) determines to some extent the hardness, toughness, brittleness and melting point as well as the solubility of the polymerized substances. It is found that good transparent resins are formed from such compounds but they may, however, have too low a softening point or be too easily scratched to be useful unless they are modified in such a way as to improve these properties.

If a compound contains two or more polymerizable unsaturated methylene groups in the same molecule, both of these groups may polymerize independently, and chain growth takes place in three dimensions. Such a structure is necessarily infusible and insoluble because of that interlocked relationship which prevents any relative motion or slippage of the chains. The material cannot be molded, since heat merely causes decomposition and pressure will crush the mass into smaller fragments of similar characteristics.

If such a compound containing more than one polymerizable group is used as a cross linking agent and is copolymerized with a substance containing but one polymerizable unsaturated methylene group, the growing chains incorporate molecules of both substances and form a three-dimensional structure. The linkages between the chains are formed to an extent depending upon the amount of cross-linking agent present, and the properties vary accordingly. I have found that if the interlinkages are too frequent in these three-dimensional structures, strains are set up which may cause the formation of small cracks throughout the whole mass, or the body may break apart into fragments due to the formation of larger cracks. Hence, such substances may be too brittle for many purposes.

The primary object of this invention is to provide resins having characteristics that are intermediate between the soluble, fusible, soft resins of linear structure and the extremely hard bodies formed by some of the three-dimensional polymers.

In accordance with my invention, I propose to copolymerize a monomeric base substance containing only one polymerizable unsaturated methylene group with monomeric divinyl ketone or di-isopropenyl ketone which serves as a cross linking agent for the linear polymers.

A further object of the invention is, therefore, to provide such copolymers and to obtain required hardness characteristics, solubility, a chosen softening point or other desired properties.

A still further object is to provide a resin capable of use as bond for granular materials, such as abrasive grain, and to make bonded articles therefrom. Other objects will be apparent in the following disclosure.

Divinyl ketone is considered to have the formula:

while di-isopropenyl ketone has the formula:

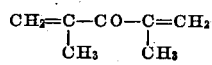

It will be apparent from the above formulae that there are two unsaturated methylene groups available for cross-linking purposes, hence the divinyl ketone and di-isopropenyl ketone will serve as cross-linking agents and form insoluble and infusible compounds or raise the softening point or modify the hardness characteristics of various mono-vinyl substances to an extent depending upon the types and proportions of the substances used.

I, therefore, propose to make a copolymer of divinyl ketone or di-isopropenyl ketone with a base substance containing only one polymerizable unsaturated methylene group which polymerizes to form a linear polymer; and the base substance should be so selected that it will be compatible with the cross-linking and other modifying agents employed. Examples of the base substances which are usefully modified by these cross-linking agents are found in the following groups:

1. Derivatives of acrylic acid and methacrylic acid, such as their esters, amides and halides.
2. Vinyl esters.
3. Polymerizable substituted ethylenes.
4. Mono-vinyl ketones.
5. Mono-vinyl ethers.
6. Mono-vinyl aldehydes.

While many other base substances may be used within the scope of my invention, the following are given as examples of those substances in the above groups which are usable with my cross-linking and modifying agents:

1. The esters of acrylic acid and methacrylic acid comprise methyl, ethyl, isopropyl and ter-butyl acrylates and methacrylates as well as other alkyl esters of these acids. They also comprise aryl esters, such as phenyl or benzyl acrylate or methacrylate or paracyclohexylphenyl acrylate or methacrylate. Acryl and methacryl amides and chlorides may also be used.

2. The vinyl esters comprise vinyl acetate, propionate, butyrate, etc.

3. The preferred substituted ethylenes are styrene, furyl ethylene, vinyl chloride and nitroethylene.

4. The preferred mono-vinyl ketones comprise methyl vinyl ketone and isopropenyl methyl ketone.

5. The mono-vinyl ethers comprise methyl vinyl ether, phenyl vinyl ether and similar substances.

6. Examples of mono-vinyl aldehydes are acrolein and alpha methyl acrolein.

The cross linking agent and the base substance may be so proportioned as to form a substantially infusible and insoluble body, or proportions may be so selected that there is relatively little cross-linking and the product will then have properties intermediate between that of the linear polymer and that of the highly cross-linked interpolymer. Similarly, the ingredients may be so proportioned as to prevent there being sufficient strain set up within the interpolymer to cause crazing or cracking and yet provide enough cross-linking to produce a body of sufficiently high softening point or hardness characteristics as to be very serviceable in a given art, such as for making an optical body or a bonded abrasive article.

Divinyl ketone and di-isopropenyl ketone are capable of modifying the substances above listed to produce interpolymers having improved hardness and heat resistance characteristics. These interpolymers are formed from mixtures of the monomeric base substance and the monomeric cross linking agent in any proportions in which the materials are fully miscible or are soluble in one another, so that the interpolymers formed therefrom are homogenous, one phase substances.

As examples of copolymers, divinyl ketone or di-isopropenyl ketone copolymerized with vinyl methyl ketone or with isopropenyl methyl ketone form bodies, the properties of which vary in accordance with the proportions employed. The use of 10% or more of the cross linking agent will make a very hard non-moldable body. On the other hand, if a small amount of the cross linking agent is used, this will give a moldable copolymer. For example, methyl methacrylate copolymerized with 0.5% of divinyl ketone makes a body much harder than polymeric methyl methacrylate and yet one which is moldable under pressure at a temperature somewhat higher than that at which methyl methacrylate alone may be molded, thus making such an interpolymer useful where moldability is required. As the amount of the divinyl ketone or other cross linking agent used is increased, the softening point is raised and the hardness characteristic varied toward the point of infusibility. If from 5 to 10% of divinyl ketone or di-isopropenyl ketone is used with methyl methacrylate, one obtains a body of good grindable properties, so that the copolymer is useful as an optical body or for purposes where a carefully finished surface is required. This interpolymer of methyl methacrylate and divinyl ketone or di-isopropenyl ketone is highly transparent. If enough of the cross linking agent is used, then the copolymer has sufficient resistance to abrasion so that it may be used for spectacle lenses and other surfaces where the optical body is subject to abrasion.

The refractive index of methyl methacrylate is about 1.49, and this may be raised or lowered by the addition of a required index modifying agent along with the divinyl ketone or di-isopropenyl ketone. If a higher refractive index is desired, then one may add styrene, which has a high refractive index of 1.5916. Other suitable high index agents are acrylic and methacrylic acid esters of the hydroxyquinolines, the hydroxydiphenyls, the nitrophenols and the chlorophenols. Other suitable agents are nitroethylene, triphenylmethyl acrylate or methacrylate, and ortho-, meta-, or para-nitrostyrene. Vinyl chloride and acetate have low indices and are useful. The index of refraction of such a triple interpolymer is proportional to the amount of the index modifying agent used and will range between the end values of the substances employed.

In accordance with this phase of the invention, I may employ any one of the base substances, such as methyl methacrylate, or isopropenyl methyl ketone, which have certain desirable properties and modify it by adding divinyl ketone or di-isopropenyl ketone for the purpose of giving required hardness characteristics, and I may further modify that interpolymer by the use of one or more polymerizable agents which have desired optical or other characteristics. Hence, I may now make a large range of bodies of required indices of refraction and dispersion values which have not been heretofore available in the optical field because of the limitations in the silicate glasses used therein.

It is also desirable in some cases to employ other hardness modifying agents along with the divinyl ketone and homologues, and for this purpose I may use such substances as allyl methacrylate, vinyl methacrylate, ethylene glycol dimethacrylate and similar compounds to make shaped bodies, such as electrical insulators, etc. I may also use up to about 30% of methacrylic acid with the other substances. Acrylic acid may be similarly used. In this way, I may suitably modify the properties of the copolymer and provide molded articles of use in many industries. For example, a body may be made of methyl methacrylate copolymerized with not over 30% of methacrylic acid and 5% of divinyl ketone. The copolymers may be made by standard polymerization methods, which involve heating the mixture with a catalyst, such as benzoyl peroxide, at a temperature, such as 50 to 60° C., which will cause the change to take place. I, however, prefer to provide very pure monomeric substances and to polymerize them without the use of a catalyst.

The copolymers containing divinyl ketone or di-isopropenyl ketone with any of the base substances and modifying agents above mentioned may also be used for bonding granular material, such as abrasive grain, and in this case the types and proportions of the agents employed will be governed by the requirements of the final product. If abrasive grains, such as crystalline alumina, silicon carbide, boron carbide or diamonds, are to be bonded by the interpolymer, the mixture of chosen monomeric substances may be incorporated with the grains in desired proportions and the bond polymerized by heat with or without the aid of a catalyst, such as benzoyl peroxide. Suitable procedure may be adopted for making such bonded articles in accordance with the method set forth in the application of Kistler and Barnes Serial No. 187,549 filed January 28, 1938, and Serial No. 228,004 filed September 1, 1938. For example, a grinding wheel may be made by placing a desired amount of the abrasive grains in a mold and then pouring into the mold a sufficient amount of the bond mixture to fill the interstives between the grains, after which the mold is subjected to heat for polymerizing the bond in place. Also, if the proportions of the base substance and modifying agent permit the substance to be softened by heat materially, then one may make the bond as a granular substance which may be mixed with the abrasive grains, together with a plasticizing medium, such as any suitable solvent which includes monomeric polymerizable liquids. Then the mixture of grains and bond may be shaped in a mold with sufficient heat and pressure to cause the bond to soften and adhere to the grains. The monomeric polymerizable plasticizer may be used in sufficient amount to wet the grains and be solidified by polymerization so that no liquid remains in the finished article. Other suitable procedures as set forth in prior applications may be employed with the base substance and the modifying agent herein disclosed and this invention is deemed to cover the products thus made.

It will be appreciated, in view of the above explanation of the invention in which methyl methacrylate and the vinyl ketones are specified in the examples of copolymers, that the other listed polymerizable base substances may be substituted therefor, and that numerous combinations thereof may be made. Also, intermixtures of two or more of these various base substances may be used with the cross linking agents. Numerous combinations of the base substance, the cross linking agent and any or several of the modifying agents may be used. It is also to be understood that while I have attempted to explain this invention in the light of the present accepted theory, yet the claims are not to be construed as dependent on any particular theory relative to the formation of the copolymer. Also, the examples above given are to be interpreted solely as illustrative of the invention and not as limitations thereon, except as set forth in the claim appended hereto. In my copending application Serial No. 240,529 filed on the same day herewith, I have claimed copolymers in which the vinyl ketones are used as base substances with various types of cross linking agents including divinyl ketone and its homologues.

I claim:

A transparent resin adapted for optical uses and comprising a copolymer of methyl methacrylate and 0.5% to 10.0% of a substance from the group consisting of divinyl ketone and diisopropenyl ketone.

CARL E. BARNES.